(12) United States Patent
Richter (10) Patent No.: US 10,337,807 B2
(45) Date of Patent: Jul. 2, 2019

(54) HEAT EXCHANGER WITH COOLANT CHANNEL AND PANEL

(71) Applicant: MAHLE International GmbH, Stuttgart (DE)

(72) Inventor: Jens Richter, Grossbottwar (DE)

(73) Assignee: MAHLE International GmbH, Stuttgart (DE)

( * ) Notice: Subject to any disclaimer, the term of this patent is extended or adjusted under 35 U.S.C. 154(b) by 101 days.

(21) Appl. No.: 15/407,494

(22) Filed: Jan. 17, 2017

(65) Prior Publication Data

US 2017/0122678 A1 May 4, 2017

Related U.S. Application Data

(63) Continuation of application No. PCT/EP2015/065987, filed on Jul. 13, 2015.

(30) Foreign Application Priority Data

Jul. 15, 2014 (DE) .................. 10 2014 213 718

(51) Int. Cl.
*F28F 9/00* (2006.01)
*F02B 29/04* (2006.01)
(Continued)

(52) U.S. Cl.
CPC .......... *F28F 9/001* (2013.01); *F02B 29/0462* (2013.01); *F02B 29/0481* (2013.01); *F28D 7/1684* (2013.01); *F28D 7/1692* (2013.01); *F28D 21/0003* (2013.01); *F28F 3/12* (2013.01); *F28F 9/22* (2013.01); *F28F 9/24* (2013.01); *F28D 2021/0082* (2013.01);
(Continued)

(58) Field of Classification Search
CPC ...... F28F 9/001; F28F 3/12; F28F 9/22; F28F 2009/222; F28F 2265/10; F02B 29/0481; F28D 7/1692; F28D 2021/0082
See application file for complete search history.

(56) References Cited

U.S. PATENT DOCUMENTS

| 2008/0087409 A1 | 4/2008 | Nakamura |
| 2012/0292002 A1 | 11/2012 | Saumweber et al. |
| 2013/0206364 A1 | 8/2013 | Fehrenbach et al. |

FOREIGN PATENT DOCUMENTS

| DE | 10 2006 043 526 A1 | 4/2007 |
| DE | 10 2010 040 983 A1 | 3/2012 |

(Continued)

*Primary Examiner* — Travis C Ruby
(74) *Attorney, Agent, or Firm* — Muncy, Geissler, Olds & Lowe, P.C.

(57) ABSTRACT

A heat exchanger for cooling a flow of media, comprising a plurality of pipes. The pipes are each received in a respective pipe base at the ends, and the pipes are received in a housing between the two pipe bases, the housing being connected to the pipe bases in a fluid-tight manner. A coolant channel is formed by a shaped region oriented outwards along an outer wall which delimits the housing. The coolant channel has an opening oriented in the direction of the inner volume of the housing, and the coolant channel is in fluidic communication with the inner volume of the housing via the opening. The opening is at least partly covered by a panel, and the panel is arranged on the housing outer wall surface oriented inwards, the outer wall having the coolant channel. A gap is formed between an edge, which delimits the opening, and the panel.

11 Claims, 7 Drawing Sheets

(51) Int. Cl.
  *F28F 9/22* (2006.01)
  *F28F 9/24* (2006.01)
  *F28D 7/16* (2006.01)
  *F28D 21/00* (2006.01)
  *F28F 3/12* (2006.01)

(52) U.S. Cl.
  CPC ..... *F28F 2009/222* (2013.01); *F28F 2265/10* (2013.01); *Y02T 10/146* (2013.01)

(56) References Cited

FOREIGN PATENT DOCUMENTS

| | | |
|---|---|---|
| DE | 10 2012 202 234 A1 | 8/2013 |
| EP | 1 707 911 A1 | 10/2006 |
| EP | 2 728 155 A1 | 5/2014 |
| FR | 2 968 753 A1 | 6/2012 |
| JP | 2012-132614 A | 7/2012 |
| WO | WO 2011/061311 A1 | 5/2011 |
| WO | WO 2013/022072 A1 | 2/2013 |

HEAT EXCHANGER WITH COOLANT CHANNEL AND PANEL

This nonprovisional application is a continuation of International Application No. PCT/EP2015/065987, which was filed on Jul. 13, 2015, and which claims priority to German Patent Application No. 10 2014 213 718.7, which was filed in Germany on Jul. 15, 2014, and which are both herein incorporated by reference.

BACKGROUND OF THE INVENTION

Field of the Invention

The invention relates to a heat exchanger for cooling a media flow, comprising a plurality of tubes, whereby the tubes are received at the ends in a respective tube sheet, whereby the tubes between the two tube sheets are received in a housing, which is connected to the tube sheet in a fluid-tight manner, whereby a coolant channel is formed by an outwardly directed shaped region along an outer wall delimiting the housing, whereby the coolant channel has an opening which is directed in the direction of the inner volume of the housing and via which the coolant channel is in fluid communication with the inner volume of the housing.

Description of the Background Art

The charge air, which is used in modern internal combustion engines to increase performance by means of a turbocharger, can be cooled by so-called charge air coolers so as to enable as great an increase in performance as possible. For this purpose, a heat transfer can be produced between the charge air and a coolant in a charge air cooler.

The charge air can be conveyed for cooling, for example, through tubes around which cooling air flows. An alternative design of a charge air cooler provides that the charge air is flowed through a plurality of tubes, while a liquid coolant flows around the tubes. The coolant itself can preferably be cooled again in a further heat exchanger to remove from the coolant the amount of heat that it has taken up from the charge air during the heat transfer.

DE 10 2006 043 526 A1 shows a charge air cooler comprising a plurality of tubes, which run between two collecting tanks and fluidically connect the collecting tanks to one another. The charge air to be cooled can be flowed through the collecting tanks and tubes. The tubes lead totally or partially through a chamber through which a coolant can flow. A heat transfer between the charge air and the coolant can be produced in this way, as a result of which cooling of the charge air can be achieved.

It is disadvantageous in the devices in the prior art that the through-flow of the heat exchanger with the coolant is not optimally designed, as a result of which so-called dead zones can occur which are characterized in that the coolant does not flow through them or flows only to a very small extent. Therefore, stagnation of the coolant can occur.

In particular due to the increasing charge air temperature in modern internal combustion engines at the inlet side of the heat exchanger, boiling of the coolant can occur, which has a disadvantageous effect on the cooling performance of the heat exchanger. This disadvantage arises especially often and markedly in charge air coolers in which the charge air and the coolant are conveyed in countercurrent to one another.

SUMMARY OF THE INVENTION

It is therefore an object of the present invention to provide a heat exchanger that reduces or totally eliminates the formation of stagnation of the coolant and thus enables better flow of the coolant through the heat exchanger.

An exemplary embodiment of the invention provides a heat exchanger for cooling a media flow, comprising a plurality of tubes, whereby the tubes are received at the ends in a respective tube sheet, whereby the tubes between the two tube sheets are received in a housing, which is connected to the tube sheet in a fluid-tight manner, whereby a coolant channel is formed by an outwardly directed shaped region along an outer wall delimiting the housing, whereby the coolant channel has an opening which is directed in the direction of the inner volume of the housing and via which the coolant channel is in fluid communication with the inner volume of the housing, the opening being covered at least partially by a panel, whereby the panel is disposed on the inwardly directed surface of the outer wall of the housing, which has the coolant channel, whereby a gap is formed between an edge, delimiting the opening, and the panel.

The main extension direction of the coolant channel preferably runs in a direction transverse to the main extension direction of the tubes. The coolant channel can therefore be used to distribute the coolant over the width of the heat exchanger or to collect the coolant from the width of the heat exchanger and to carry it out of the heat exchanger. The coolant within the heat exchanger flows around the tubes and flows in particular in the free spaces formed between the tubes.

The heat exchanger preferably has two opposite narrow sides and two opposite broad sides. The width of the heat exchanger is measured between the opposite narrow sides, whereas the height is measured in the direction of the main extension direction of the tubes. The depth of the heat exchanger is measured between the opposite broad sides.

A panel, which at least partially covers the coolant channel opening, directed toward the inner volume of the heat exchanger, is especially advantageous, because by reducing the opening cross section a slowing down of the coolant flow into the coolant channel or out of the coolant channel can be achieved. The slowing down furthermore leads to an increase in flow resistance, which in turn has a positive effect on the maximum achievable cooling performance.

Furthermore, the flow direction of the coolant can be influenced by a panel. In particular, by the orientation of the gap, which arises due to the only partial covering of the opening of the coolant channel, the flow of the coolant can be influenced such that a greater flow to the at least one tube sheet is achieved. It is especially advantageous in this case, if the tube sheet at which the higher temperatures arise during operation is supplied increasingly with the coolant. In a heat exchanger with a countercurrent flow, due to the high temperatures of the air to be cooled this is the tube sheet that is disposed adjacent to the coolant outlet.

The panel can form a gap on the coolant channel side facing the tube sheet, so that the coolant can flow past the coolant channel along the panel and flows further in the direction of the tube sheet, before it is redirected at the tube sheet and flows over through the gap into the coolant channel.

The panel is especially advantageous in order to leave the cross-sectional area of the coolant channel as large as possible, in order to assure a flow as undisturbed as possible within the coolant channel, and simultaneously to form a restriction site, which increases the pressure loss during the flowing over of the coolant between the inner volume and the coolant channel, in order to achieve a selective influence on the direction of the coolant flow. This is particularly advantageous compared with a merely smaller design of the coolant channel, which would lead to a substantially poorer distribution of the coolant along the width of the heat exchanger.

The coolant channel can be disposed at a first end region of the housing, the region being closed off by one of the tube sheets. This is especially advantageous in order to form the overflow site of the coolant from the inner volume into the coolant channel or vice versa as close as possible to the tube sheets, in order to form a flow section through which the coolant flows as large as possible within the heat exchanger.

It is especially advantageous, if the width of the gap between the panel and the edge, delimiting the opening, increases or decreases in the direction of the main extension direction of the coolant channel.

A pressure loss that is variable over the width of the heat exchanger can be produced by an increasing or decreasing gap width along the main extension direction of the coolant channel, as a result of which the flowing over of the coolant from the inner volume into the coolant channel is additionally promoted or made more difficult. This is it is especially advantageous to achieve a still far-reaching influence on the coolant flow.

The opening can have a rectangular cross section, whereby the gap is formed between the panel and the edge delimiting the opening and facing the first end region of the housing.

It can be achieved by such an arrangement of the gap that the coolant flows past the panel increasingly in the inner volume of the heat exchanger and flows into the coolant channel via the gap only after flowing against the tube sheet. A longer flow section for the coolant is realized in this way, and simultaneously a greater flow against the tube sheet. This results in a higher heat uptake by the coolant and in an improved heat removal from the tube sheet.

The panel can be formed by a planar, plate-like element. A planar, plate-like element is especially advantageous in forming the panel as space-saving as possible. As a result, an additional negative influence on the coolant flow within the heat exchanger due to the panel can also be prevented.

The outer wall of the housing, the wall having the coolant channel, on its inner side at the edge, delimiting the opening, can have an at least partially circumferential depression into which the panel can be inserted. This is especially advantageous to connect the panel to the inner side of the outer wall such that it terminates flush with the wall and produces no overhang. Preferably, the depression has a depth which corresponds to the material thickness of the panel. In an alternative embodiment, the depression has a depth that corresponds to the material thickness of the panel and an additional seal. By the flush attachment of the panel, a planar attachment of the tubes to the inner side of the wall and the panel can be achieved, as a result of which the sealing between the housing and the tubes is simplified.

The coolant channel can be in fluid communication with a fluid connection disposed in the extension of the coolant channel, whereby the fluid connection is formed as a fluid inlet or fluid outlet.

The coolant channel can be formed in the axial extension of a fluid connection, so that the coolant can flow directly out of the fluid connection into the coolant channel or vice versa.

The fluid connection can be in fluid communication with the coolant channel via a funnel-shaped area, whereby the flowing of the coolant between the inner volume of the heat exchanger and the fluid connection occurs entirely via the coolant channel.

An especially flow-enhancing transition can be achieved by a fluid-tight connection of the fluid connection to the coolant channel via a funnel-shaped area. A flowing over between the fluid connection and the inner volume entirely by means of the coolant channel is especially advantageous to prevent flow around the restriction site formed by the panel or by the gap.

The coolant channel can be completely covered by the panel in the direction of its main extension direction. This is advantageous to assure that a coolant transfer from the inner volume into the coolant channel or vice versa occurs as close as possible to the particular adjacent tube sheet, and the longest possible flow path overall for the coolant within the heat exchanger is produced. The coolant flow in addition can be redirected in this way selectively in the direction of the tube sheet, as a result of which the heat removal at the tube sheet is improved.

The panel can be bolted to the housing. In alternative embodiments, the panel can also be soldered to the housing or be connected to the housing by another fastener known to one skilled in the art or from the prior art.

The panel can have a water barrier on the side facing the inner volume of the housing and/or the coolant channel. A water barrier is especially advantageous to prevent a leakage flow along the contact surfaces of the panel at the housing. The water barrier acts as a seal to assure a targeted transport of the coolant through the gap.

The coolant channel can form a bypass through which the coolant can flow past the tubes disposed in the housing and into the free spaces formed between the tubes. The coolant channel is used preferably for distributing or collecting the coolant over the width of the heat exchanger. In this case, the coolant passes from the coolant channel into the free spaces formed between the tubes or flows out of these free spaces into the coolant channel.

The panel can at least partially cover the opening of the coolant channel at a fluid connection serving as the fluid outlet, whereby the coolant can flow from the direction of the tube sheet adjacent to the coolant channel along the gap into the coolant channel. This is especially advantageous to achieve that the coolant flow before flowing over into the coolant channel is redirected first to the adjacently disposed tube sheet. In particular because the heat exchangers are flowed through preferably in a countercurrent principle, an especially high temperature arises at the tube sheet, which is disposed adjacent to the coolant outlet, due to the hot air flowing into the tubes.

The housing can have a fluid connection at each narrow side, whereby in each case in the axial extension of the fluid connection a coolant channel produced by an outwardly shaped region on a broad side of the housing, whereby the coolant channels are disposed on the same broad side of the housing. The arrangement of the fluid connections on opposite narrow sides is especially advantageous to obtain an optimal distribution of the coolant over the entire width of the heat exchanger.

The housing can have, for example, two coolant channels, whereby one of the coolant channels is in fluid communication with a fluid outlet and the other coolant channel is in fluid communication with a fluid inlet, whereby one or both coolant channels are at least partially covered by a panel. This is advantageous to achieve the most optimal redirecting possible of the coolant flow at the coolant inlet and/or at the coolant outlet and thus to improve the heat transfer between the air and the coolant. It is advantageous in particular in this case, if by the arrangement of the panel/s the flow path of the coolant within the heat exchanger is increased and the coolant flows increasingly into a tube sheet or both tube sheets to produce a better heat transport away from the tube sheets.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
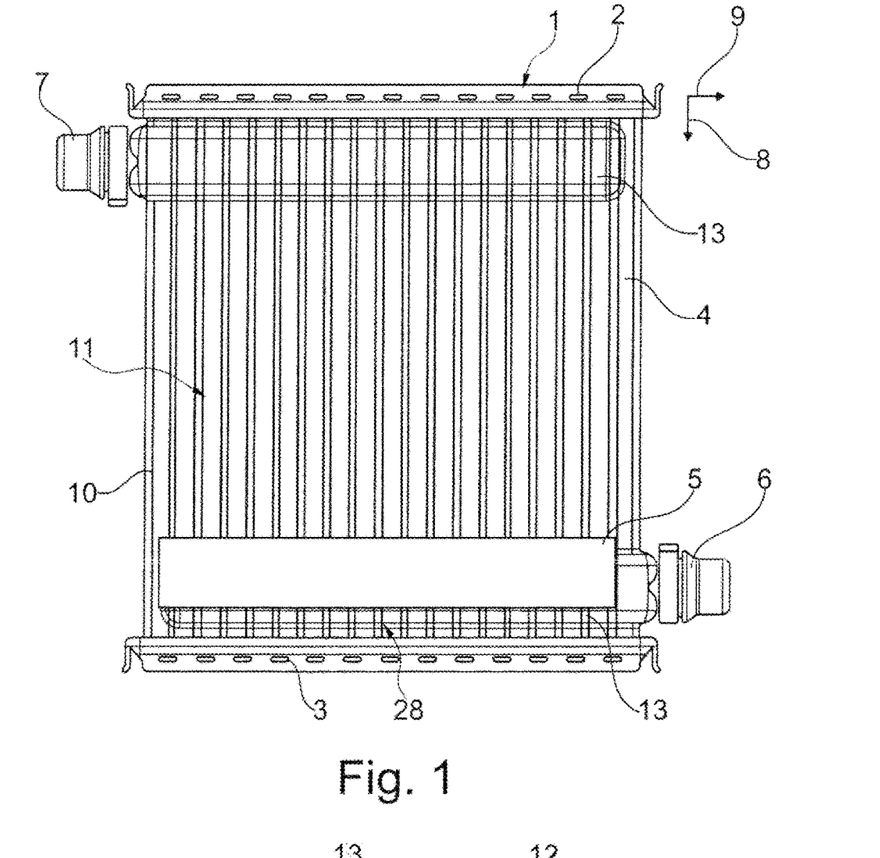
FIG. 1 shows a side view of a heat exchanger with a panel, which at least partially covers one of the coolant channels.

FIG. 1 shows a view of a heat exchanger 1. Heat exchanger 1 is formed by a plurality of tubes 4 which are arranged parallel to one another and at the ends are each received in a tube sheet 2 located at the top and a tube sheet 3 located at the bottom. In the illustration in FIG. 1, the housing surrounding tubes 4 is not shown. A fluid connection 7 is shown at the top left end region and a second fluid connection 6 at the bottom end region. In an advantageous embodiment, fluid connection 7 is used to supply the coolant, whereas fluid connection 6 is used to remove the coolant from heat exchanger 1. The housing has a first end region 28, which represents the end region of the housing that is closed off by tube sheet 3. Tube sheet 3 in this case is located adjacent to fluid connection 6 formed as a fluid outlet. Especially high temperatures, which can lead to boiling of the coolant, arise in particular at the tube sheet 3.

The heat exchanger 1 has two opposite narrow sides 10 and two likewise opposite broad sides 11. Tubes 4 made preferably as flat tubes are arranged next to one another along broad sides 11. Narrow sides 10 and broad sides 11 form the outer walls of the housing.

A media flow, which is preferably formed by air, used as charge air for charging an internal combustion engine, flows through tubes 4. Hereinafter, air is always mentioned as the medium flowing through the tubes, whereby this does not represent a restriction to air. A coolant flows through the housing of heat exchanger 1, as a result of which in particular the air within tubes 4 is cooled.

A rectangular, plate-like panel 5 is disposed in the interior of heat exchanger 1. The panel is connected to one of the inner surfaces of the housing (not shown), for example, by screwing together or by a tox connection, and covers in particular a section of an inwardly directed opening of coolant channel 13, which is formed in the outer wall of the housing.

A coolant channel 13 is formed in the outer wall of the housing both in the extension of fluid connection 7 and in the extension of fluid connection 6. Coolant channels 13 can be used depending on the through-flow direction either for distributing the coolant along broad side 11 of heat exchanger 1 or for collecting the coolant along broad side 11.

In FIG. 1 panel 5 is disposed over coolant channel 13, which is associated with fluid outlet 6. In alternative embodiments, the coolant channel of the fluid inlet can also be partially covered by a panel.

Furthermore, a coordinate system with spatial directions 8 and 9 is shown in FIG. 1. Spatial direction 8 extends parallel to the main extension direction of tubes 4, whereas spatial direction 9 extends transverse to tubes 4 along the width of the heat exchanger. Both broad sides 11 of heat exchanger 1 extend along spatial direction 9. The two spatial directions 8 and 9 also serve as a basis for the exemplary embodiments in the following figures.

Figure 2:
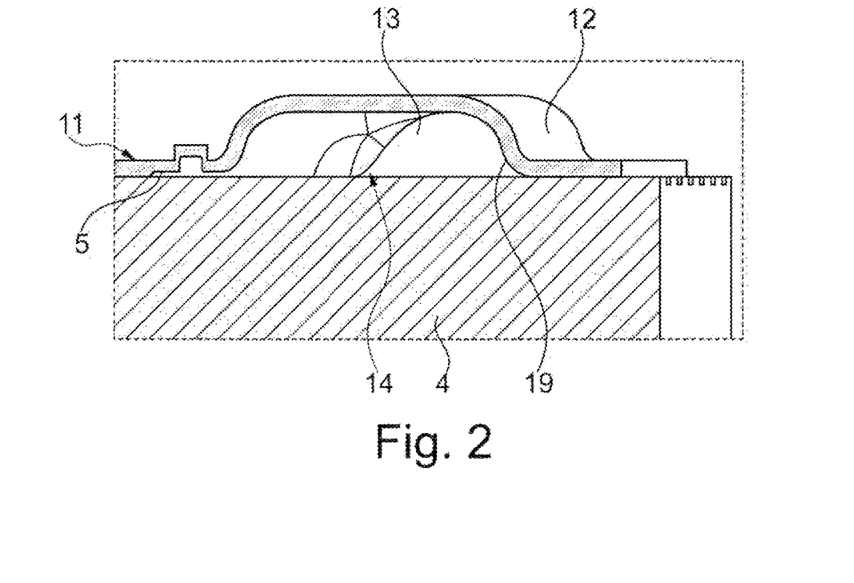
FIG. 2 shows a detailed view of a coolant channel produced by a shaped region of the housing.

FIG. 2 shows a detailed view of a coolant channel 13. As can be seen in FIG. 2, coolant channel 13 is formed by a shaped region of housing 12 outwardly from tubes 4. Coolant channel 13 is formed on one of broad sides 11 of housing 12. Coolant channel 13 has an inwardly directed opening 14, which is delimited by circumferential edge 19. The coolant can flow over between coolant channel 13 and the inner volume of housing 12 through opening 14 or the cross section of opening 14 not covered by panel 5.

The inner volume of housing 12 is substantially formed by the free spaces between tubes 4. Because housing 12 adjoins the narrow sides of tubes 4, a through-flow of the inner volume within housing 12 can occur only along the free spaces between tubes 4. Depending on the through-flow direction, the coolant can flow over from coolant channel 13 into the free spaces between tubes 4 or flow over from the free spaces into coolant channel 13.

Figure 3:
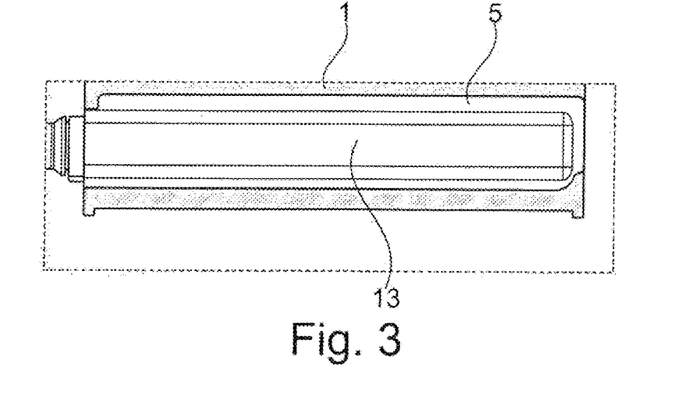
FIG. 3 shows a detailed view of the panel, which at least partially covers the coolant channel.

FIG. 3 shows a detailed view of coolant channel 13, which is partially covered by panel 5. The bottom section of heat exchanger 1 of FIG. 1 is illustrated in FIG. 3. Panel 5 serves as a barrier for the coolant to improve the flow distribution.

Figure 4:
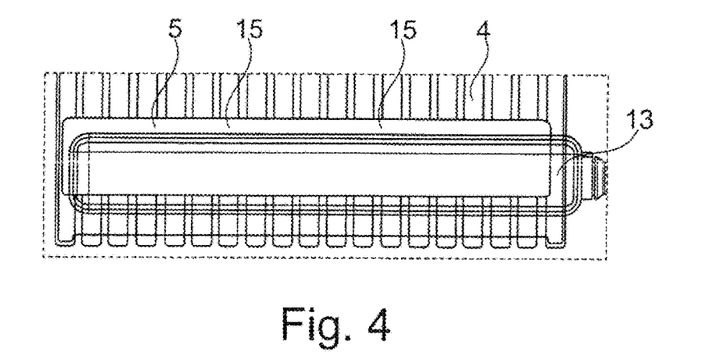
FIG. 4 shows a view of the area of the heat exchanger, which has the coolant channel covered by the panel.

FIG. 4 shows a further detailed view, whereby panel 5 can be seen, which can be connected via holes 15 to housing 12, which is not shown in FIG. 4. Tubes 4 and the free spaces formed between tubes 4 can be seen in the background behind panel 5. As can be seen in FIG. 4, the entire opening of coolant channel 13 is not covered by panel 5, but only a defined section. A gap between panel 5 and the edge, which delimits the opening and is formed by the wall of housing 12, forms in particular along the bottom edge region of coolant channel 13. A coolant transfer into coolant channel 13 or out of it can be realized by the gap, which is shown in detail in the following figures.

Figure 5:
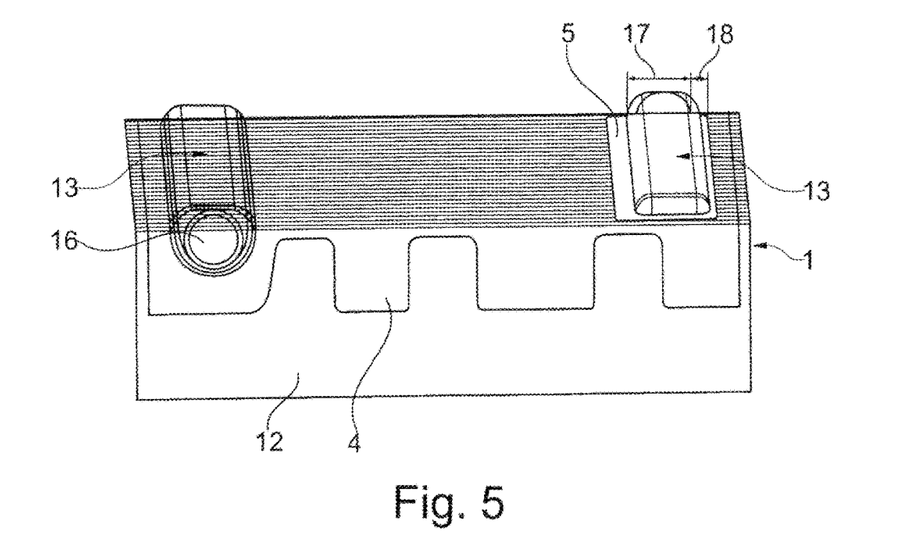
FIG. 5 shows a perspective view of the heat exchanger, whereby the housing surrounding the tubes is not shown in its entirety.

FIG. 5 shows a further view of a heat exchanger 1, whereby housing 12 is only partially indicated. Heat exchanger 1 in FIG. 5 is shown situated horizontally.

Both coolant channels 13, which are formed on the upwardly directed broad side 11, are indicated by line drawings in FIG. 5. In particular the opening cross-sectional surface of fluid connection 7 with the reference character 16 is shown in left coolant channel 13.

As can be seen in FIG. 5, panel 5 covers only a section of the opening of right coolant channel 13. The covered region, in particular along spatial direction 8, is shown with the reference character 17. The gap, which forms a transfer surface between the free spaces between tubes 4 and coolant channel 13, is shown with the reference character 18. The opened gap 18 acts in particular as a restriction site, because it substantially reduces the actual transfer surface from the inner volume of heat exchanger 1 into coolant channel 13. A restriction site can be produced by providing a panel 5, without the actual flow cross section of coolant channel 13 being changed, as a result of which further an optimal through-flow of coolant channel 13 is assured.

Figure 6:
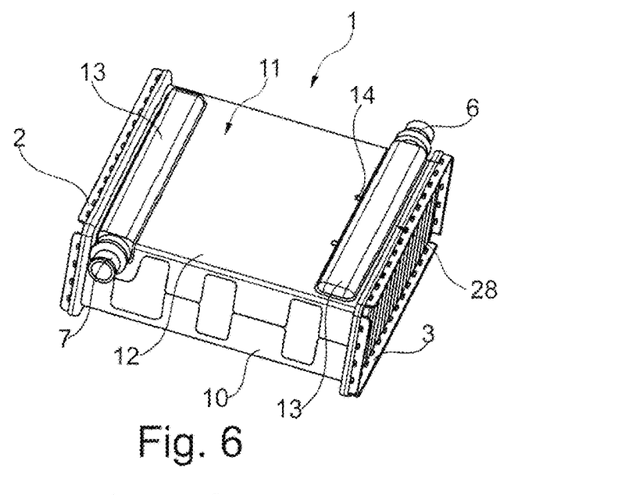
FIG. 6 shows a perspective view of the heat exchanger, whereby the tube sheets are shown in which the tubes are received at the ends.

FIG. 6 shows a further perspective view of heat exchanger 1. Housing 12 is shown with both shaped coolant channels 13 and fluid connections 6 and 7, located in the extension of the particular coolant channels 13, and both tube sheets 2 and 3. Coolant channels 13 are both located on the same broad side 11 of heat exchanger 1, whereas fluid connections 6 and 7 are located on the respectively opposite narrow sides 10. The first end region 28 of the housing represents the end region at which especially high temperatures arise due to the flow of air in the tubes.

Figure 7:
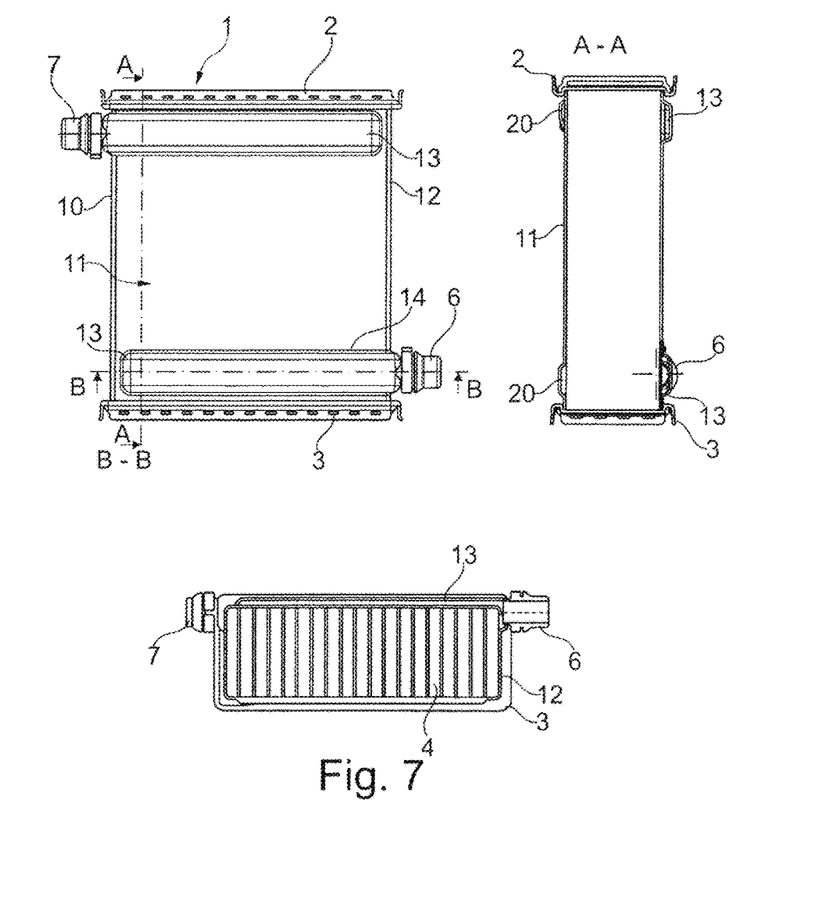
FIG. 7 shows a side view of the heat exchanger, whereby a sectional view through the heat exchanger along the main extension direction of the tubes is shown in the right section of FIG. 7 and a sectional view along a direction transverse to the main extension direction of the tubes in the bottom section.

FIG. 7 in the left top area shows a side view of heat exchanger 1 according to FIG. 6. In the left top area of FIG. 7, the sectional plane A-A, which extends along main extension direction 8 of tubes 4, is shown along heat exchanger 1. Furthermore, sectional plane B-B is shown, which extends along spatial direction 9. Section A-A through heat exchanger 1 is shown in the right part of FIG. 7. It can be seen here that a further shaped section 20, through which the coolant can also flow within heat exchanger 1, is provided approximately at the same height opposite to coolant channels 13 on the opposite broad side 11. Both coolant channels 13 and shaped regions 20 can extend over another section of broad sides 11, so that in these areas 13, 20 an overflow of the coolant between the free spaces, which are formed between tubes 4, is possible.

Section B-B, which cuts through bottom coolant channel 13 and fluid connection 6, is shown in the bottom part of FIG. 7. Flat tubes 4, which are arranged parallel to one another and are received in housing 12, are shown in section B-B. Fluid connection 7 is shown in the left area of section B-B.

Figure 8:
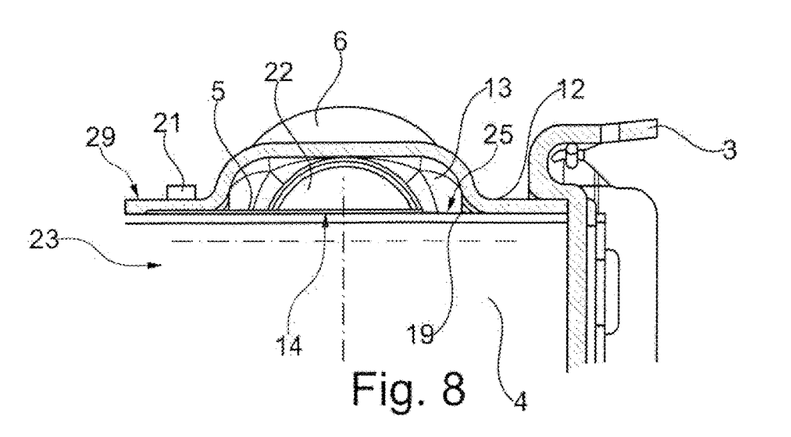
FIG. 8 shows a detailed view of the coolant channel, which is at least partially covered by the panel.

FIG. 8 shows a detailed view of coolant channel 13 at fluid connection 6. A portion of fluid connection 6 is covered by tubes 4. Panel 5 is fixed to housing 12 in the exemplary embodiment of FIG. 8. Panel 5 extends parallel to the main extension direction of tubes 4 over a large section of opening 14 of coolant channel 13. A gap 25, which forms a transfer surface between coolant channel 13 and inner volume 23 of heat exchanger 1, results between edge 19, which delimits opening 14 and is formed by the wall of housing 12, and panel 5. Tube sheet 3 in which tubes 4 are received at the ends is indicated at the right end region of FIG. 8.

Fluid connection 6 merges via a funnel-shaped area with coolant channel 13 at least partially delimited by panel 5. Tube 4, located directly adjacent to fluid connection 6, can form with its wall, facing fluid connection 6, a part of the funnel-shaped area. The funnel-shaped area is delimited further by the inner walls of housing 12, as a result of which the coolant can flow out of fluid connection 6 only directly into coolant channel 13 or vice versa.

Panel 5 is inserted in a depression 29, which is formed at least partially circumferentially around opening 14. Due to the insertion into depression 29, the side of panel 5, the side being directed toward inner volume 23 of heat exchanger, terminates flush with the wall having coolant channel 13. As a result, an especially exactly fitting and sealing contact of tubes 4 with the inner side of housing 12 is possible.

Figure 9:
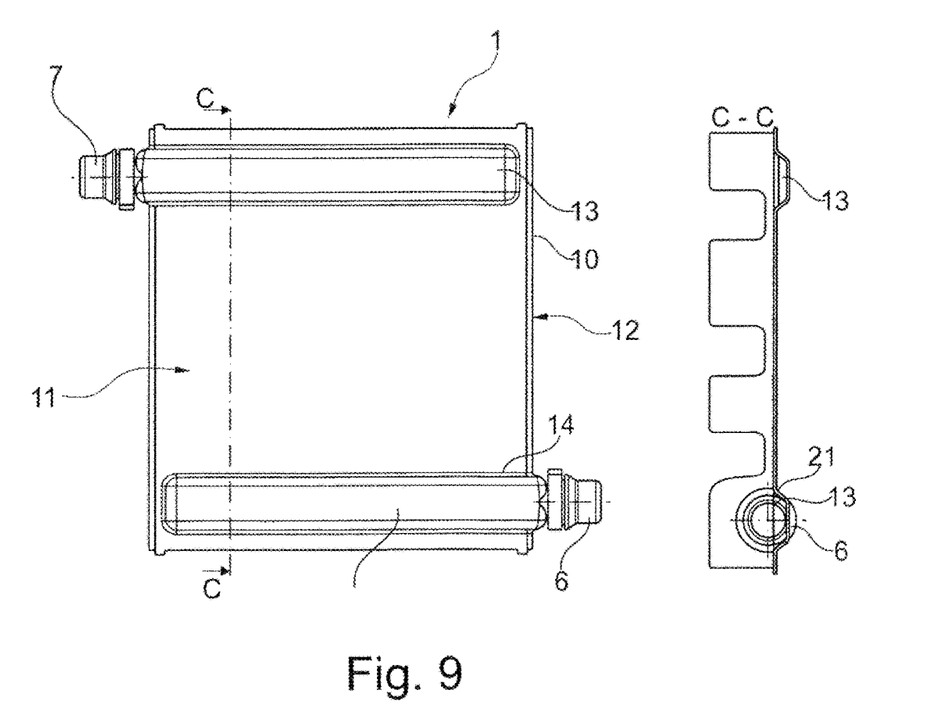
FIG. 9 shows a side view of the heat exchanger in the left section and a sectional view through the heat exchanger along the main extension direction of the tubes in the right section.

FIG. 9 in the left area shows a side view of a broad side 11 of heat exchanger 1. In the area of bottom coolant channel 13, holes, to which panel 5 can be attached, in housing 12 are shown with the reference character 14. In the right part of FIG. 9, section C-C is shown, which passes along spatial direction 8 through heat exchanger 1.

Both coolant channels 13 and fluid connection 6 can be seen in section C-C. Furthermore, connection 21 is shown by which panel 5 is fixed relative to housing 12.

Figure 10:
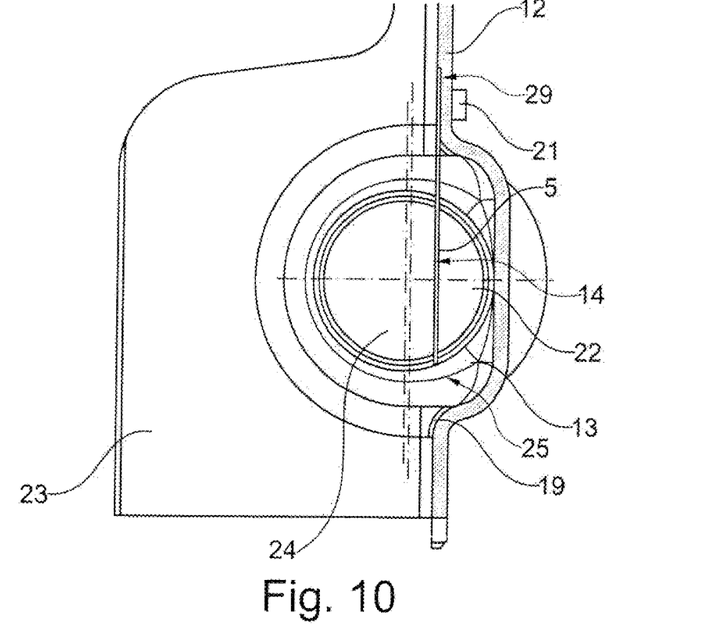
FIG. 10 shows a detailed view according to FIG. 8, whereby the tubes of the heat exchanger are not shown.

FIG. 10 shows a detailed view of coolant channel 13 with mounted panel 5, which is connected via connection 21 to housing 12. Tubes 4 are not shown in inner volume 23 in the illustration of FIG. 10 in comparison with FIG. 8. Furthermore, gap 25 can be seen, which is formed between panel 5 and the edge delimiting the opening of coolant channel 13.

Figure 11:
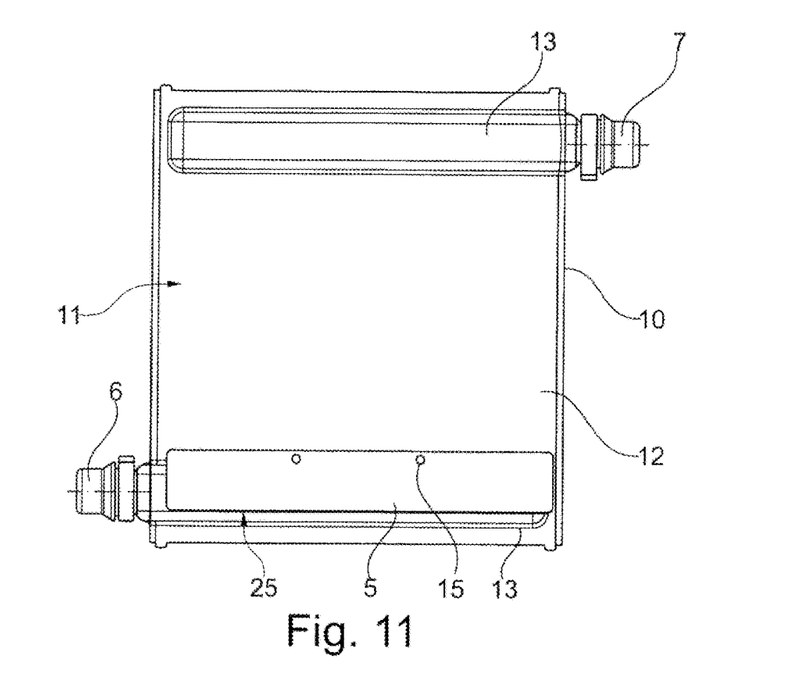
FIG. 11 shows a side view of the broad side of the heat exchanger, whereby the panel is mounted and at least partially covers the bottom coolant channel.

FIG. 11 shows a side view according to the left illustration in FIG. 9. In FIG. 11, panel 5 is mounted and connected along holes 15 to housing 12 of heat exchanger 1. In FIG. 11, bottom gap 25 can be seen, which serves as a passage between coolant channel 13 and the inner volume of heat exchanger 1. As can be seen further in FIG. 11, panel 5 is spaced apart from the inner wall of housing 12 along spatial direction 9. This space can be covered, for example, by one of the tubes in the interior of heat exchanger 1. In particular the funnel-shaped area, which forms the transition between fluid connection 6 and coolant channel 13, can be formed along this space. A flowing over of the coolant into the inner volume in the area of the space is preferably prevented by walls, such as, for example, the walls of a tube 4.

Figures 12, 13:
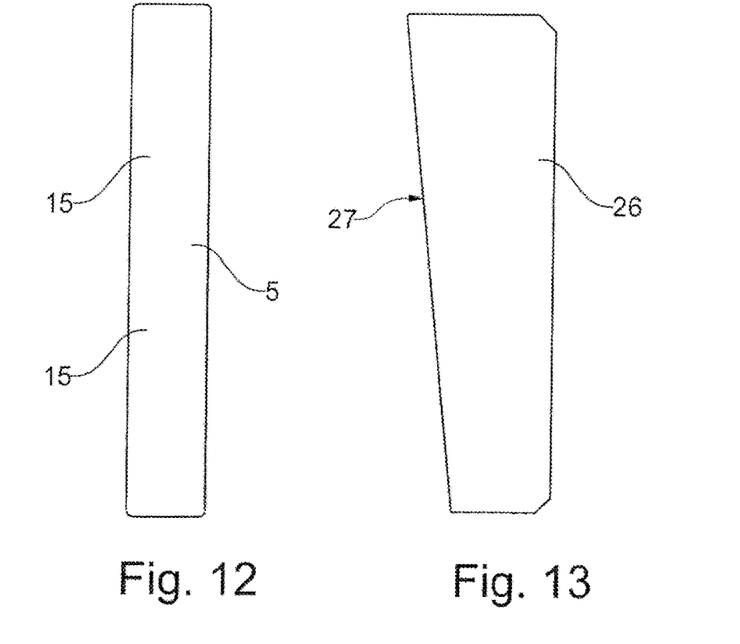
FIG. 12 shows a view of a rectangular, plate-like panel.
FIG. 13 shows a view of an alternatively designed embodiment panel with at least one obliquely extending outer edge.

FIG. 12 shows a view of the rectangular, plate-like panel 5 with holes 15, by means of which panel 5 can be attached to housing 12.

Panel 5 is formed in particular by a plate-like element, which has large extensions along two spatial directions, whereas the extension in the third spatial direction, which is formed in FIG. 12 as the surface normal to the plane of the drawing, is much smaller than in the two other spatial directions.

FIG. 13 shows an alternatively shaped panel 26, which is characterized in particular in that one of the edges has an oblique course along the main extension direction of panel 26. It is achieved in this way that the gap, which forms between coolant channel 13 and panel 26, increases or decreases with an increasing distance from the fluid connection. This depends on the orientation of panel 26 relative to fluid connection. Furthermore, panel 26 has beveled corners on the end region directed to the right. In an alternative embodiment, the panel can also have an edge with a serrated course, so that the gap is delimited on the one side by a serrated outline.

Figure 14:
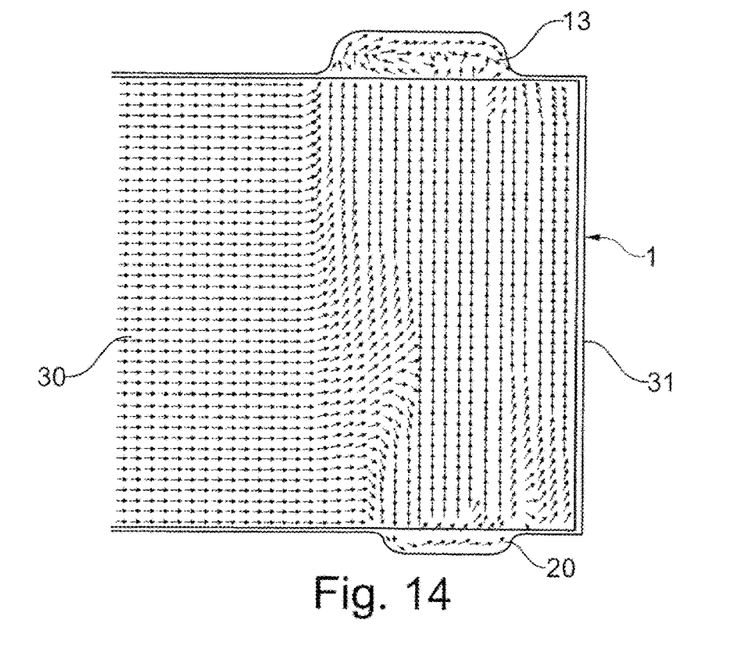
FIG. 14 shows an illustration of the velocity vectors of the coolant flow within the heat exchanger, whereby the coolant channel on the coolant outlet side is not covered by a panel.

FIG. 14 shows an illustration of velocity vectors 30 of the coolant flow within heat exchanger 1. In FIG. 14, a heat exchanger 1 is shown without a panel in front of coolant channel 13. It can be seen that vectors 30 are oriented in such a way that the coolant flow points primarily directly toward coolant channel 13 and only a small portion of the coolant is conveyed to bottom region 31. Bottom region 31 corresponds to the region in which the tubes are received in the tube sheet.

Because of the flow through heat exchanger 1 in countercurrent, high temperatures arise due to the hot air, flowing into the tubes in region 31, particularly in bottom region 31, which is disposed adjacent to the coolant outlet side. As a result, boiling of the coolant can occur in region 31, which is disadvantageous with respect to the achievable cooling performance. The more coolant is supplied to bottom region 31, the better the heat of the hot air can be removed, as a result of which a greater cooling performance in heat exchanger 1 can be produced.

Figure 15:
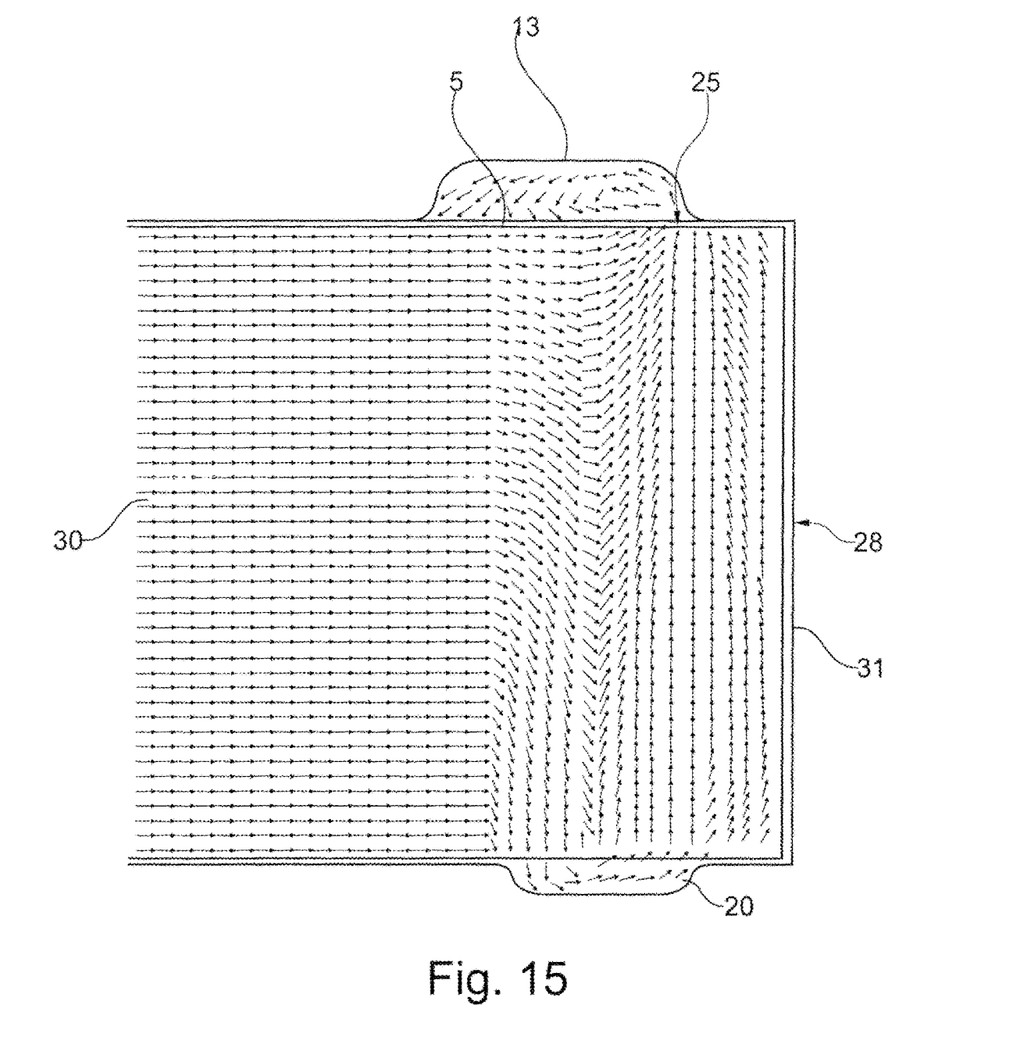
FIG. 15 shows an illustration of the velocity vectors of the coolant flow within the heat exchanger, whereby the panel is arranged over the coolant channel on the coolant outlet side.

FIG. 15 shows an illustration of velocity vectors 30 in a heat exchanger 1 with an installed panel 5. It can be seen in FIG. 15 that a greater distribution of the coolant occurs toward bottom region 31 and toward formation 20 formed relative to coolant channel 13. As a result, the coolant flows in an intensified manner along bottom region 31, before it flows over through gap 25 into coolant channel 13. Thus, a favorable effect on the coolant flow within heat exchanger 1 is created, as a result of which greater heat removal can be realized and the boiling of the coolant can be considerably reduced or totally prevented. Therefore, a greater flow through first end region 28 of the housing is achieved by panel 5.

The individual features of the exemplary embodiments of the previous FIGS. 1 to 15 can also be combined in particular with one another. FIGS. 1 to 15 have no restrictive nature with respect to material selection, the shape of the individual elements, and the arrangement of the individual elements relative to one another. FIGS. 1 to 15 serve to clarify the inventive concept and do not restrict the solution to the shown exemplary embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger for cooling a media flow, the heat exchanger comprising:
    a plurality of tubes, at least a portion of the plurality of tubes being received at ends in a respective tube sheet, wherein the tubes between two tube sheets are received in a housing, which is connected to the tube sheets in a fluid-tight manner;
    a coolant channel formed by an outwardly directed shaped region along an outer wall delimiting the housing, the coolant channel having an opening that is directed in a direction of an inner volume of the housing and via which the coolant channel is in fluid communication with the inner volume of the housing, wherein the opening is at least partially covered by a panel that is attached to an inwardly directed surface of the outer wall of the housing, which has the coolant channel; and
    a gap formed between an edge delimiting the opening and the panel,
    wherein an edge of the panel that extends in a direction of the main extension direction of the coolant channel tapers from a first end to a second end, such that a width of the gap between the edge of the panel and the edge of the coolant channel that delimits the opening, increases or decreases in the direction of the main extension direction of the coolant channel.

2. The heat exchanger according to claim 1, wherein the coolant channel is disposed at a first end region of the housing, the first end region being closed off by one of the tube sheets.

3. The heat exchanger according to claim 1, wherein the opening has a rectangular cross section, and wherein the gap is formed between the panel and the edge delimiting the opening and facing the first end region of the housing.

4. The heat exchanger according to claim 1, wherein the panel is formed by a planar plate element.

5. The heat exchanger according to claim 1, wherein the inwardly directed surface of the outer wall of the housing having the cooling channel has an at least partially circumferential depression at the edge delimiting the opening, wherein the panel is inserted into the at least partially circumferential depression.

6. The heat exchanger according to claim 1, wherein the coolant channel is in fluid communication with a fluid connection disposed in the extension of the coolant channel, and wherein the fluid connection is formed as a fluid inlet or as a fluid outlet.

7. The heat exchanger according to claim 6, wherein the fluid connection is in fluid communication with the coolant channel via a funnel-shaped area, and wherein a flowing of the coolant between the inner volume of the heat exchanger and the fluid connection occurs entirely via the coolant channel.

8. The heat exchanger according to claim 1, wherein the coolant channel is completely covered by the panel in a direction of the main extension direction of the coolant channel.

9. The heat exchanger according to claim 1, wherein the housing has two coolant channels, wherein one of the coolant channels is in fluid communication with a fluid outlet and the other coolant channel is in fluid communication with a fluid inlet, and wherein one or both coolant channels are at least partially covered by a panel.

10. The heat exchanger according to claim 1, wherein the panel is attached directly to the inwardly directed surface of the outer wall of the housing.

11. The heat exchanger according to claim 1, wherein the panel has broad sides and narrow sides and the two tube sheets each have openings that receive the tubes, and wherein the broad sides of the panel are oriented perpendicular to a respective surface of each of the two tube sheets having the openings.

* * * * *